United States Patent
Seymour (10) Patent No.: US 8,614,878 B2
(45) Date of Patent: Dec. 24, 2013

(54) NANOSCALE INTERCALATION MATERIALS ON CARBON POWDER, PROCESS FOR PRODUCTION, AND USE THEREOF

(76) Inventor: Fraser W. Seymour, Middletown, MD (US)

(*) Notice: Subject to any disclaimer, the term of this patent is extended or adjusted under 35 U.S.C. 154(b) by 335 days.

(21) Appl. No.: 13/190,006

(22) Filed: Jul. 25, 2011

(65) Prior Publication Data

US 2011/0281176 A1    Nov. 17, 2011

Related U.S. Application Data

(63) Continuation-in-part of application No. 12/015,839, filed on Jan. 17, 2008, now Pat. No. 7,986,509.

(51) Int. Cl.
*H01G 9/00*    (2006.01)
(52) U.S. Cl.
USPC ........... 361/502; 361/503; 361/504; 361/509; 361/512; 361/516

(58) Field of Classification Search
USPC ......... 361/502, 503–504, 509–512, 516–519, 361/523, 525, 528–529; 429/188, 221, 223, 429/224, 321
See application file for complete search history.

(56) References Cited

U.S. PATENT DOCUMENTS

| | | | | |
|---|---|---|---|---|
| 5,772,974 A | * | 6/1998 | Ohashi et al. | 423/447.7 |
| 6,013,208 A | * | 1/2000 | Nakamura et al. | 264/29.4 |
| 6,862,167 B1 | * | 3/2005 | Banno et al. | 361/502 |
| 7,167,355 B2 | * | 1/2007 | Chen | 361/508 |
| 7,651,819 B2 | * | 1/2010 | Long et al. | 429/245 |
| 7,719,820 B2 | * | 5/2010 | Degen et al. | 361/502 |
| 8,254,086 B2 | * | 8/2012 | Mastro et al. | 361/502 |

* cited by examiner

*Primary Examiner* — Nguyen T Ha (57) ABSTRACT

An electrode material is created by forming a thin coating or small deposits of metal oxide as an intercalation host on a carbon powder. The carbon powder performs a role in the synthesis of the oxide coating, in providing a three-dimensional, electronically conductive substrate supporting the metal oxide, and as an energy storage contribution material through ion adsorption or intercalation. The metal oxide includes one or more metal oxides. The electrode material, a process for producing said electrode material, an electrochemical capacitor and an electrochemical secondary (rechargeable) battery using said electrode material is disclosed.

12 Claims, 5 Drawing Sheets

Bare Carbon Powder Granule   Coated Carbon Powder Granule

NANOSCALE INTERCALATION MATERIALS ON CARBON POWDER, PROCESS FOR PRODUCTION, AND USE THEREOF

CROSS-REFERENCE TO RELATED APPLICATIONS

This application is a continuation-in-part U.S. application Ser. No. 12/015,839, filed on Jan. 17, 2008, and claims priority thereto; the foregoing application being incorporated herein by reference.

FIELD OF THE INVENTION

The present invention relates to a material for use as an electrode for electrochemical energy storage devices such as electrochemical capacitors (ECs) and secondary batteries, and a method for producing the same. More specifically, this invention relates to an electrode material consisting of a highly porous carbon powder coated with deposits comprising one or more transition metal oxides, a method for producing the same, and an EC and secondary battery using the electrode materials.

BACKGROUND OF THE INVENTION

Electrochemical capacitors (referred to as ultracapacitors or supercapacitors) are devices that use electrolytes that contain and conduct ions in conjunction with electrodes that are ionically and electronically conductive, as a system to store energy. Unlike batteries, which store charge within the bulk electrode material itself, ECs store charge at or near the interface between the electrolyte and electrode material making EC storage a surface phenomenon. EC devices store charge via one of two mechanisms: electric "double-layer" or faradaic "pseudocapacitance". Alternatively, intercalation materials typical of secondary lithium ion batteries can be combined with materials exhibiting one or more of these aforementioned storage mechanisms as a way to increase the amount of energy stored.

Electric double layer capacitors (EDLCs) store charge at the interface between the ion-rich electrolyte and an electronically conductive electrode comprising material such as activated carbon (AC). The amount of charge stored is a function of this interfacial area, which is in turn related to the electrode surface area accessible by the electrolyte-solvated ions. AC electrodes typically have surface areas between 1000 and 3000 $m^2/g$ achieved by a high concentration of micropores (pore diameter<2 nm). This concentration of micropores paradoxically serves to limit the capacitance to a range between 15 and 30 $uF/cm^2$ because micropores are too small to accommodate the solvated ions necessary for the double layer mechanism. AC electrodes are typically fabricated as films formed from a paste comprising powdered AC, binder and conductivity-enhancing carbon. While the accessibility of the electrolyte to much of the surface area of such an electrode is limited, thus limiting the electrode capacitance and ultimately device energy density, the micropore geometries also serve to limit electrode charge/discharge rates and ultimately limit device power density.

Pseudocapacitance involves electron transfer in oxidation/reduction reactions that take place between the electrolyte ions and the electrode active materials over a voltage range similar to that of the EDLC. Electrode active materials being researched for this type of behavior include graphitic carbons, conductive polymers and transition metal oxides.

Transition metal oxides exhibit characteristics both desirable and otherwise for EC devices. In general, these oxides exhibit improved specific capacitance vs. carbon materials, but they typically do so at a monetary cost or at the expense of cycle life and power density. As an example of the former, the specific capacitance of hydrous ruthenium oxide has been demonstrated to be higher than 700 F/g, which is far greater than any known carbon EDLC. However, the cost and lack of abundant supply of the ruthenium materials prohibit broad commercial use.

Lower cost, plentiful transition metal oxides such as manganese oxide, nickel oxide and others have been investigated and in some cases commercialized. The specific capacitance of these materials ranges from approximately 200 F/g for powder/paste derived thick films (tens of microns to hundreds of microns) to more than 500 F/g for very thin planar films of less than 100 nanometers. This difference in capacitance (and ultimately energy density) demonstrates the surface nature of the pseudocapacitance charge storage mechanism. However, power density also is limited by the surface nature of pseudocapacitance as the longer ion diffusion length of thicker material serves to reduce reaction rate. The power density of electrodes using these oxides is further limited by the very low intrinsic electronic conductivity of these materials. These oxides also exhibit limited cycle stability and operating voltage ranges limited to approximately 0.8 volts.

Metal oxide paste-derived electrodes combine the powdered metal oxide with a binder and conductivity-enhancing carbon similar to the EDLC activated carbon electrode. The resulting electrode is limited by the characteristics noted above and also the lack of surface area readily accessible to the electrolyte. The limited pore volume also impedes ion flow to the inner electrode surfaces further limiting the pseudocapacitance reaction rate.

EC devices employing a metal oxide thick film configure their systems in such a way so as to use the oxide-based electrode as a largely static energy storage element creating an offset voltage from which a carbon electrode only is cycled through charge and discharge. This configuration is known in the art as an asymmetric EC.

As a way of using pseudocapacitance to increase device energy, U.S. Pat. No. 6,339,528 discloses the synthesis of an layered, amorphous phase manganese oxide containing potassium ions on a carbon powder, which is then ground to form a paste used with a binder to form an electrode for an aqueous-only ultracapacitor cell. Others have suggested similarly coating carbon nanotubes with amorphous manganese oxide subsequently mixing the coated nanotubes with a binder to form an EC electrode. While each of these approaches offer improved rate performance resulting from the reduced ion diffusion length vs. the simple oxide paste electrodes, the increase in stored energy is limited by the pseudocapacitance charge storage mechanism provided by the amorphous oxides used.

Long et al. (see for example, 20080247118; 20080248192; and 20100176767) have proposed an approach for addressing these shortcomings by applying a very thin coating of poorly crystalline $MnO_2$ or iron oxide to a carbon structure. In doing so, the high capacitance and fast reaction rate of the thin film approach is preserved. Further, the 3-dimensional carbon structure provides a low (electronic) resistance path to the current collector and an open porosity providing much improved electrolyte ion access to the $MnO_2$ or iron oxide active material. The synthesis approach suggested by Long involves the reduction of permanganate or potassium ferrate (VI) on the surface of the carbon. This takes place as the coating is deposited utilizing the carbon as a sacrificial reductant to synthesize the oxide. The oxide deposition method suggested by Long results in a conformal coating of the carbon structure. Again, the oxides formed in these cases are of the amorphous variety, providing pseudocapacitive behavior which produces less energy storage capacity than intercalation materials typically provide.

While the previously discussed improvements in EC technology are highly significant, there remains a need in the art for EC devices and therefore EC electrodes having expanded operating voltage range and increased the storage capacity while also exhibiting high power density.

Lithium ion secondary batteries operate through the intercalation/de-intercalation of lithium ions into and out of the solid bulk electrode materials. Today's lithium ion electrode materials typically comprise a graphite-based anode and a transition metal oxide (typically cobalt, nickel or manganese) cathode. During the charging cycle, electrons are removed from the cathode, which causes charge-compensating lithium ions to be released into and dissolved in the electrolyte where they migrate towards the anode; while electrons are simultaneously added to the anode causing lithium ions to be inserted into the anode. The opposite occurs during discharge.

Ion insertion (diffusion) into the bulk oxide cathode material takes place in vacancies present in the oxides. The rate of this process is affected by the diffusion length and the accessibility of the electrolyte to the oxide. This rate in turn affects the instantaneous power capability of the battery.

The fabrication method of these electrodes relies on powdered active materials formed into a paste including binder material and (electronic) conductivity enhancing carbon. The thickness of these cathodes ranges from 30 micrometers for high power (low energy) batteries to 200 micrometers for high-energy (low power) versions. Typical oxide powder particle sizes vary from hundreds of nanometers to a few micrometers in diameter. Lithium ions diffuse as much as a few microns into the bulk oxide particle. The charge-compensating electrons from the oxide must then traverse the low-conductivity oxide and electrolyte to complete the circuit.

Ion diffusion into the solid-state electrode particles induces mechanical stress on the oxide crystal lattice as it expands to accommodate the ion insertion. These expansion/contraction cycles cause the eventual breakdown of the oxide limiting device cycle life. It is therefore preferable for the diffusion into the oxide to be as shallow as possible and to choose ion/oxide systems that exhibit minimal expansion.

While the previously discussed improvements in secondary battery technology are highly significant, there remains a need in the art for secondary battery devices and therefore secondary battery electrodes having improved cycle life, shorter recharge time and generally increased usable storage capacity at elevated power levels.

SUMMARY OF THE INVENTION

The aforementioned need for improvements in electrode operating voltage range and storage capacity for an EC device as well as improvements in electrode cycle life, reduced recharge times and increased usable storage capacity at elevated secondary battery power levels are provided by the use of an electrode material consisting of a carbon powder coated with deposits comprising one or more transition metal oxides. The transition metal oxide deposits are of a highly crystalline phase suitable as an intercalation host thereby providing increased storage capacity versus that provided by the carbon materials alone. The oxide film is simultaneously synthesized and deposited thereby forming a conformal oxide deposit upon the carbon powder.

Such electrode material nanoscopic thin oxide deposit exhibits high specific power because the oxide active material is more accessible to the electrolyte ions than is possible with oxide powder-based approaches.

The openness of the material provides electrolyte ion access to the oxide film in a way that supports high rate ion transport with minimized ion starvation.

While many factors affect the rate of diffusion of an ion into a metal oxide during intercalation (approximately 10-9 $cm^2/s$ for lithium into $LiMnO_2$), it is clear such processes occur relatively slowly. Therefore, intercalation reaction rates are faster where diffusion lengths are shorter as is the case in thinner oxide layers. Due to the nanoscopic thin oxide deposit, the ion diffusion length is as much as two orders of magnitude less than that of typical oxide powder based films having micron-scale powder grains. The result is an enhanced rate of intercalation reaction versus powder oxide film approaches.

The carbon powder substrate exhibits a very high electronic conductivity of 20-50 Siemens/cm or more vs. $10^{-5}$ to $10^{-8}$ Siemens/cm for manganese oxide, depending upon the oxide phase. This reduction in electrode electronic resistance of between 5 and 8 orders of magnitude will greatly improve device power density and reduce heat generated.

The oxide deposit may be configured for increased capacity or a greater operating voltage range with improved stability vs. a single oxide, depending upon the oxide and phase used. For example, the partial substitution of nickel for manganese in $LiNi_xMn_{2-x}O_4$ provides an increase in redox potential due to the $Ni^{2+/4+}$ redox couple, increasing electrode operating voltage to ca. 4.7V (versus lithium plating potential). as opposed to ca. 4.2V of a $LiMn_2O_4$.

The electrode material not only is suitable as a material for EC and secondary batteries, but also may be used as hybrids of the two, a lithium-ion capacitor.

DETAILED DESCRIPTION OF THE INVENTION

The present invention is directed particularly towards electrode materials created by forming a thin coating of metal oxide on a carbon, which is a sub-unit of an electrode and is in the form of a nanometer-scale or micrometer-scale powder with nano-scale features. One purpose of the carbon is to provide double-layer capacitance to the system. In the case of nanometer-scale carbons such as nanotubes, graphene etc., an additional purpose of the carbon is to provide the surface access and diffusion benefits of nanomaterials with improved electronic transport. In the case of activated carbon powder, another purpose of the carbon is to provide materials with these aforementioned characteristics in a size and form that is similar to typical capacitor and battery materials used by the industry already permitting the use of current manufacturing techniques that are compatible with current manufacturing equipment in ways nanoscale materials. These electrode materials are for use in electrochemical energy storage devices including electrochemical capacitors and secondary batteries when combined with additional materials such as binder and conductivity-enhancing carbon black and optionally additional storage materials. Such electrochemical capacitor or secondary battery includes for example an electrolyte, an electronically insulating but ionically conductive separator film, a pair of electrodes separated by said separator and electrolyte, each electrode physically attached and electronically connected to a current collector, wherein at least one of said electrodes comprise the electrode material comprising a carbon with surface deposits of metal oxide as described herein as part of a composite further comprising a binder and one or more of activated carbon, hard carbon, carbon nanotubes, carbon nanofibers, graphene or graphite. The electrolyte comprises salts of alkali metal in an aqueous solvent, in a non-aqueous solvent, in a polymer, in an ionic liquid or any combination thereof. The second electrode, if not an electrode material as defined herein, is selected from a group consisting of one or more metal oxides; a metal phosphate, a metal carbide; a metal nitride; a composite carbonaceous paste comprising powder of one or more of activated carbon or carbon nanofibers or carbon nanotubes or graphene or any combination thereof, with binder and conductivity enhancing carbon; a composite carbonaceous paste comprising graphitic carbon powder, hard carbon powder, metal oxide/carbon composites, silicon/carbon composites, or any combination thereof with binder and conductivity enhancing carbon; or a porous activated carbon structure. The current collector is selected from a group consisting of metal foil, metal mesh, electrically conductive polymer composites, expanded metal, or combinations thereof.

Hereinafter, various embodiments of the present invention will be explained in more detail with reference to the accompanying figures; however, it is understood that the present invention should not be limited to the following preferred embodiments and such present invention may be practiced in ways other than those specifically described herein.

The electrode material comprises a carbon powder with surface deposits of metal oxide as intercalation host wherein said coating is produced by an oxidation/reduction reaction occurring between the metal salt contained in an aqueous precursor solution and the surface of said carbon when said carbon is infiltrated with said precursor solution; wherein transition metal species contained in said precursor solution are reduced on the surface of the carbon and co-deposited in oxide form upon the carbon; wherein said aqueous precursor solution is maintained at a temperature above about 20° C. and below about 250° C. during said infiltration; wherein an autoclave is the reaction vessel when synthesis temperatures above about 100° C. are used; wherein said infiltration is accomplished by immersion and equilibration of said carbon in a bath of said aqueous metal salt precursor solution or by application of pressure spray consisting of said aqueous metal salt precursor solution upon said carbon; wherein the solvent of said aqueous metal salt precursor solution shall contain one or more of purified water, an organic solvent such as an alcohol, a pH buffer, additional cation salts or any combination thereof; wherein said aqueous metal salt precursor solution shall comprise one or more salts of metals selected from a group consisting of manganese, nickel, cobalt, iron, aluminum, chromium, molybdenum, rhodium, iridium, osmium, rhenium, vanadium, tungsten, tantalum, palladium, lead, tin, titanium, copper, zinc, niobium and lithium; wherein the electrode material is used as prepared or the counter ions incorporated in the oxide coating are exchanged for other cations or protons; wherein the formed electrode material is used as-prepared or wherein the formed electrode material is heated subsequent to formation of the oxide, such heating to occur as hydrothermal processing at temperatures above about 70° C. and below about 250° C. in an autoclave or with the use of microwave radiation or at temperatures above about 70° C. and below about 1000° C. in inert atmosphere or in oxidizing atmosphere or in reducing atmosphere or any combination thereof. In one embodiment, said oxidation/reduction reaction between said carbon and said aqueous metal salt precursor solution occurs while the reactants are exposed to microwave energy. In one embodiment, said aqueous precursor solution shall comprise ultrapure water, or a buffer solution with or without organic co-solvent or additional cations, further comprising one or more metal salt in the form of $M(NO_3)_y \cdot xH_2O$, $MCl_y \cdot xH_2O$, $MF_y$, $MI_y$, $MBr_y$, $(MCl_y)_z \cdot xH_2O$, $M(ClO_4)_y \cdot xH_2O$, $MF_y$, $M_y(SO_z)_w$, $MSO_y \cdot xH_2O$, $M_yP$, $MPO_y \cdot xH_2O$, $M(OCH_y)_z$, $MOSO_y \cdot xH_2O$, $M(C_yO_z) \cdot xH_2O$, where x is a value greater than or equal to 0 and less than or equal to 12 and y is a value greater than or equal to 0 and less than or equal to 4 and z is a value greater than or equal to 0 and less than or equal to 4 and w is a value greater than or equal to 0 and less than or equal to 4, and M is selected from a group consisting of manganese, nickel, cobalt, iron, aluminum, chromium, molybdenum, rhodium, iridium, osmium, rhenium, vanadium, tungsten, tantalum, palladium, lead, tin, titanium, copper, zinc, niobium and lithium; or $NaMnO_4$, $KMnO_4$, $LiMnO_4$, $K_2FeO_4$; or titanium(III) chloride tetrahydrofuran complex (1:3), titanium diisopropoxide bis(acetylacetonate), titanium(IV) isoproprxide, titanium(IV) (triethanolaminato) isoproprxide, titanium(IV) bis(ammonium lactato)dihydroxide, titanium(IV) butoxide, titanium(IV) ethoxide, titanium(IV) oxyacetylacetonate, titanium(IV) phthalocyanine dichloride, titanium(IV) propoxide, titanium(IV) sulfide, titanium(IV) tert-butoxide, titanium(IV) 2-ethylhexyloxide, $K_2TiF_6$, $FeSO_4NH_3CH_2CH_2NH_3SO_4 4H_2O$, Iron(II) acetate, Iron(II) acetylacetonate, ammonium iron (III) oxalate trihydrate, Iron(III) citrate, $NaNO_3$, $KNO_3$, $LiNO_3$, $Na_2SO_4$, $K_2SO_4$, $Li_2SO_4$, NaOH, KOH, LiOH.

The metal oxide coating may comprise water, ions and shall contain one or more metal oxides selected from a group consisting of oxides of manganese, nickel, cobalt, iron, aluminum, chromium, molybdenum, rhodium, iridium, osmium, rhenium, vanadium, tungsten, tantalum, palladium, lead, tin, titanium, copper, zinc, niobium and lithium.

In one embodiment, the carbon powder is composed of a polymer-derived carbon xerogel. In another embodiment, the carbon powder comprises material selected from a group consisting of carbon microfibers, carbon nanofibers, carbon nanotubes, graphite, graphene, carbon black, activated carbon or any combination thereof. The carbon powder may be formed with or without templating agents, may be activated or not activated and may be doped with nitrogen or un-doped.

Nitrogen doping of carbon materials is used as a method to increase electronic conductivity by modifying the partially p-type carbon to a more n-type material, thereby increasing electron concentration in the conduction band. In one embodiment, ammonia is used as a nitrogen source. In other embodiments, urea or melamine is used as a nitrogen source.

Coated electrode material may be used as-synthesized or the counter ions may be fully exchanged or partially exchanged for a different ion species or for protons. Coated electrode materials may be heated subsequent to formation of the nanoscale oxide; such heating to occur as hydrothermal processing at temperatures above about 70° C. and below about 250° C. in an autoclave or with the use of microwave radiation or at temperatures above about 70° C. and below about 1000° C. in inert atmosphere or in oxidizing atmosphere or in reducing atmosphere or any combination thereof. Such ion exchange and heating techniques represent some of the synthetic controls that can be used to create oxide phases suitable to specific applications. For example, $xMO_2/C$ where C is the carbon, x is the cation such as lithium and M is a highly crystalline spinel or other phase manganese and/or other oxide formed on the carbon using the synthesis herein at ambient conditions followed by cation exchange for lithium and subsequent heat treatments. The spinel $LiM_2O_4/C$ is formed where M may be manganese with or without dopants or partial substitutions with elements such as nickel, may be used as cathode material suitable for aqueous or non-aqueous electrochemical capacitor applications, or as cathode material for secondary lithium-ion battery applications.

Other oxide deposits on carbon powders are contemplated such as $Li_4M_5O_{12}/C$, $LiMO_2/C$ or $Li_{28+y}M_{20}O_{48}/C$ where $0<y<8$ and where M may be titanium with or without niobium and/or tantalum and/or vanadium as dopants or partial substitutions as $M_2O_7/C$ or independent oxides as $M_2O_5/C$. In these cases, the oxide/carbon material may be used as anode material in non-aqueous electrochemical capacitor applications, or as anode material for secondary lithium-ion battery applications.

Another example of metal/oxide deposits for carbon powders contemplated herein include $M_3O_4/C$ where M may be manganese and/or iron and/or cobalt. In this case, M is cycled between low-valence oxide and metallic states, and may be used as anode material for use in secondary battery applications such as lithium ion. These materials may be synthesized, for example, using permanganates alone and/or nitrates of manganese and/or cobalt. The permanganate is used as a reducing agent and a source of manganese; cobalt nitrate, for example, may be optionally used with the permanganate as an additional ion source. In the case wherein permanganate is not used, (as in the cobalt case or manganese oxide not using permanganate route) a precursor salt such as a nitrate may be used in an aqueous solution with reducing agents such as an alcohol and/or ammonia at ambient or other temperatures. In the case of $Fe_3O_4/C$, iron salts such as potassium ferrate and/or iron(III) chloride hexahydrate may be used as precursor materials. In all cases, the MOx/C materials are subsequently heated to temperatures ranging from about 100° C. to about 250° C. as hydrothermal processing in an autoclave or from about 250° C. to about 600° C. in inert atmosphere for between 1 and 24 hours. In certain cases, subsequent heating to temperatures ranging from about 100° C. to about 300° C. in air may be required to obtain the desired oxygen stoichiometry. Also, in some cases, lithium may be used as the counter ion prior to heating for the purpose of assisting in templating the desired oxide phase and/or providing a source of lithium that may be appropriate in a lithium ion device. In some cases, the counter-ions may be exchanged for protons prior to or following heating.

EXAMPLE I

Fabrication of Electrode; Birnessite Manganese/Nickel Oxide Film on Carbon Nanofoam.

Figure 1:
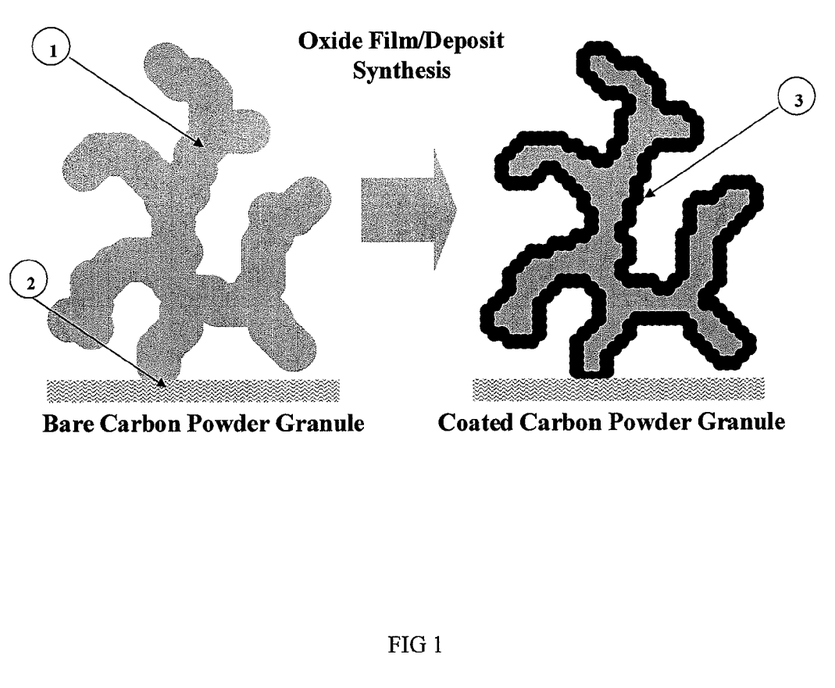
FIG. 1 shows a cross-sectional view of the oxide coating on a carbon forming an electrode. 1 represents bare carbon, 2 represents current collector and 3 represents oxide layer on the electrode carbon.

An electrode material as illustrated in FIG. 1 was formed by immersing a carbon for a controlled period of time in a solution comprising permanganate and nickel salts in a controlled ratio dissolved in ultra-pure water/pH buffer at a controlled pH and temperature. The manganese and nickel from the aqueous permanganate/nickel precursor solution are reduced on the surface of the carbon and co-deposited upon the carbon forming an insoluble oxide film.

Carbon paper supported aerogel was purchased from a commercial source (Marketech International Inc.) with an approximate thickness of 170 micrometers. Carbon nanofoam paper was cut into pieces of approximately 1 centimeter by 1 centimeter and then soaked and vacuum saturated in purified water.

In this exemplary embodiment, the aqueous metal salt precursor solution comprised manganese/nickel mixture ratios 4:1. The mixture concentration of nickel (II) nitrate hexahydrate ($Ni(NO_3)_2 6H_2O$) was normalized to 0.1M sodium permanganate ($NaMnO_4$, other counter-ion sources may be substituted for sodium (Na) such as potassium (K) or lithium (Li)) and combined with purified water/pH buffer solution of 0.1M $NaH_2PO_4$ and 0.1M NaOH for neutral pH film synthesis. Another experiment was carried out at an elevated pH of 12 using a buffer solution of 0.05M $Na_2HPO_4$ and 0.1M NaOH.

The wetted carbon was then immersed in the precursor solutions, vacuum equilibrated and left immersed for a period of time ranging from approximately 15 minutes to 20 hours. These synthesis processes were carried out at room temperature.

The resulting electrode materials were removed from the precursor solution, rinsed with purified water and dried in a nitrogen environment at 50° C. for 20 hours and again under vacuum at room temperature for an additional 12 hours.

EXAMPLE II

Figure 2:
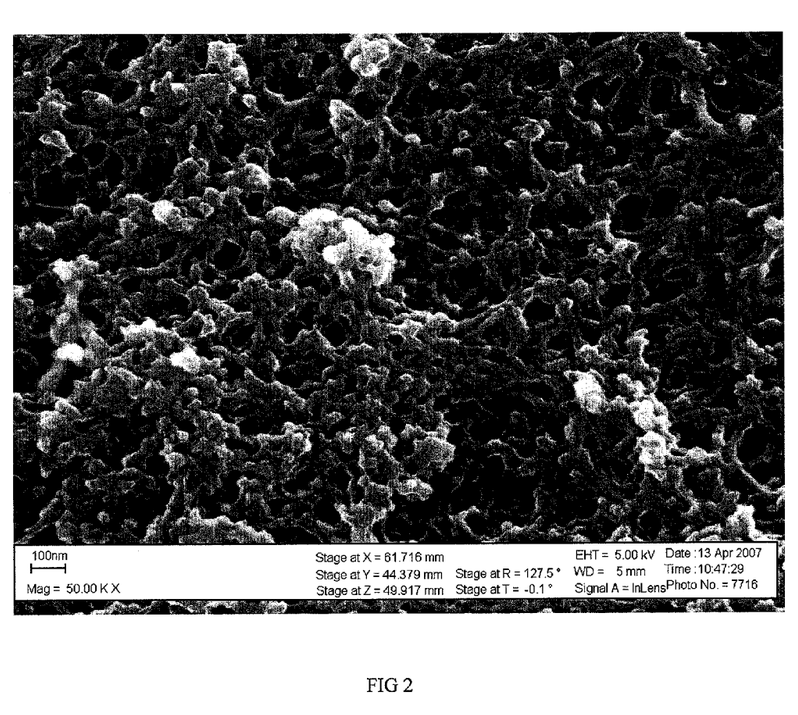
FIG. 2 shows a scanning electron micrograph of a nickel/manganese oxide film on a porous carbon xerogel.

Characterization of Electrode Material; Manganese/Nickel Oxide Film on Carbon Nanofoam The resulting electrode is shown in FIG. 2 scanning electron micrograph image. This image clearly shows the material feature scale, the conformal oxide coating and the absence of pore occlusion.

Figure 3:
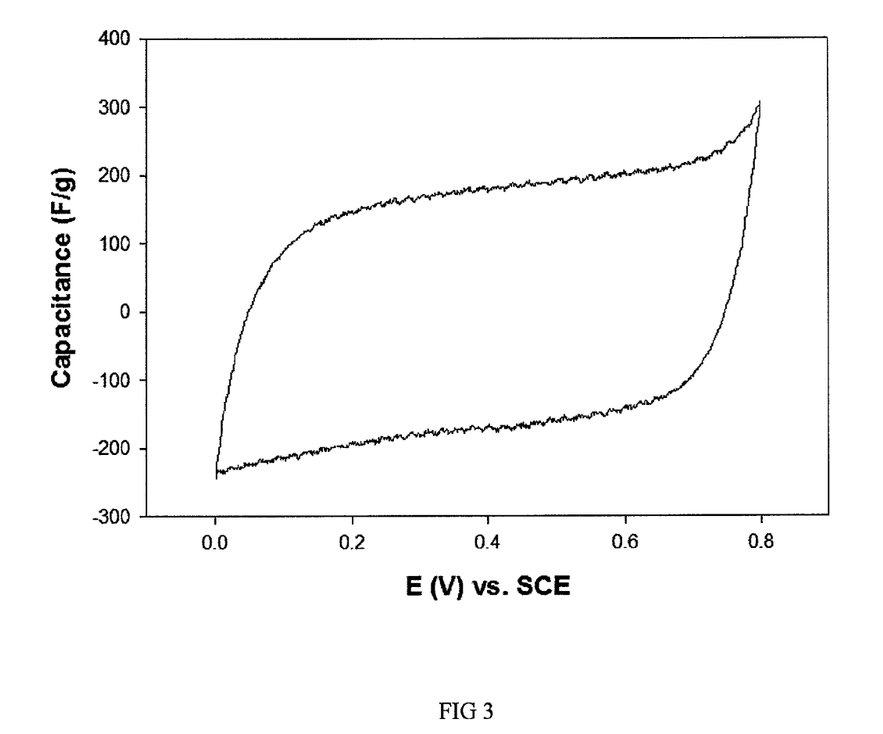
FIG. 3 shows a pseudocapacitive-type behavior in a cyclic voltammogram for Example 1; poorly crystalline nickel/manganese electrode material at 10 mv/S in 1M LiCl.
Figure 4:
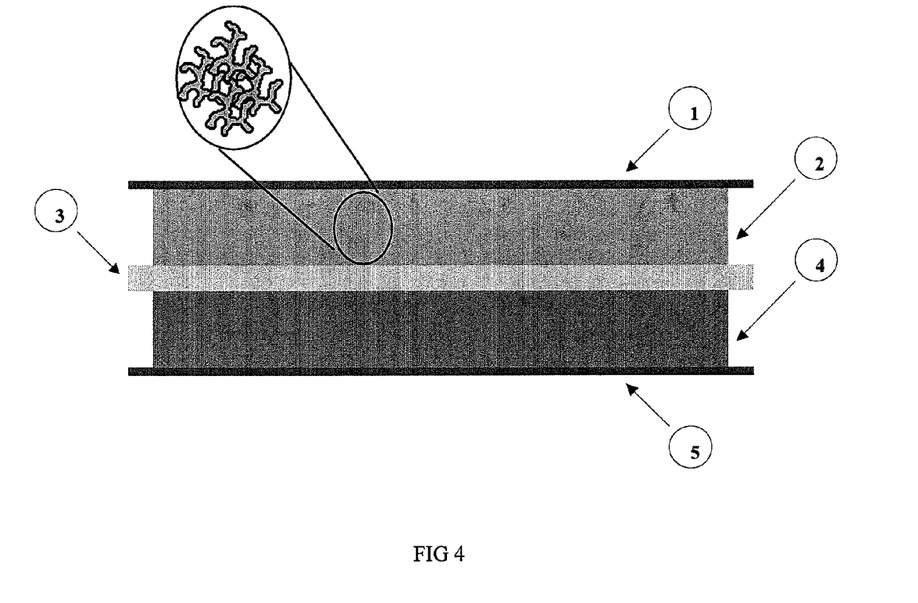
FIG. 4 shows a constitutional drawing of an electrochemical cell such as an EC or secondary battery. 1 represents the cathode current collector, 2 represents the cathode, 3 represents the electrolyte/separator, 4 represents the anode and 5 represents the anode current collector.

Experiments have yielded capacitances of 180 F/g in 1M LiCl for the 4:1 manganese/nickel oxide in this electrolyte and approximately 200 F/g in other electrolytes such as potassium hydroxide (KOH). FIG. 3 shows cyclic voltammetry data of a 4:1 manganese/nickel oxide material with capacitance of approximately 180 F/g in 1M LiCl electrolyte evidencing pseudocapacitive-type behavior of the amorphous oxide phase

EXAMPLE III

Fabrication of Electrode; Nanoscale Oxide Film Comprising Spinel Manganese Doped with Nickel on Supported Carbon Xerogel.

An electrode material is formed as in EXAMPLE I, using a precursor ratio of about 0.99:0.01 manganese:nickel.

Prior to drying, counter ions are exchanged for lithium ions by immersion of the formed electrode in an aqueous solution bearing lithium ions such as lithium nitrate, lithium sulfate or lithium hydroxide, for example. In this exemplary embodiment, lithium nitrate was used. Such immersion is carried out first under vacuum equilibration, then at room temperature or elevated temperature or under microwave heating, for example. In this exemplary embodiment, about 30° C. for about 2-4 hours was used.

The material was subsequently heated to about 300-350° C. under nitrogen atmosphere for about 1-2 hours, followed by heating at about 200-220° C. in air for about 3-6 hours.

EXAMPLE IV

Characterization by Cyclic Voltammetry of Electrode; Nanoscale Oxide Film Comprising Spinel Manganese Doped with Nickel on Supported Carbon Xerogel.

Figure 5:
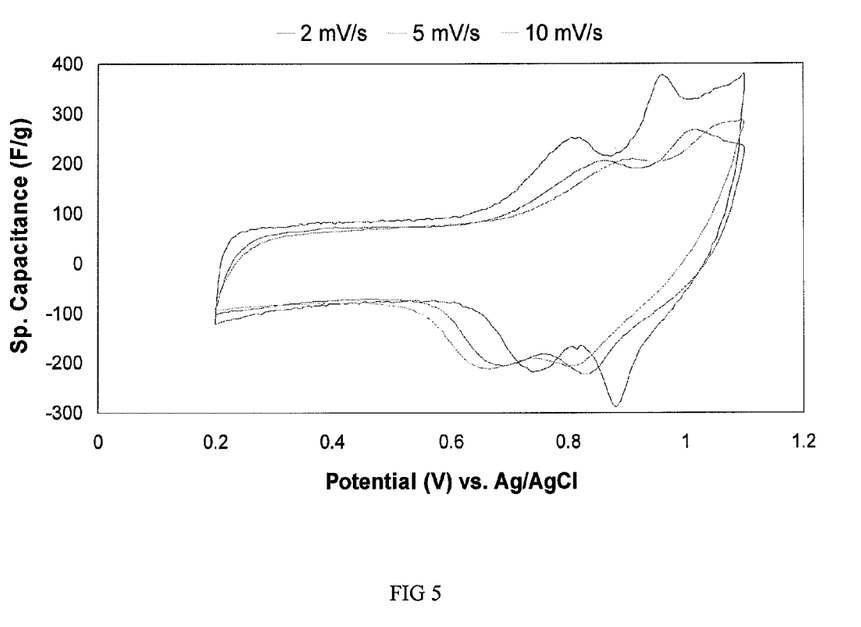
FIG. 5 shows a more classic insertion redox behavior in a cyclic voltammogram for Example 3; more crystalline oxide containing spinel phase electrode material at in $2M Li_2SO_4$.

FIG. 5 shows cyclic voltammetry data of nickel doped manganese spinel/carbon material with average capacitance of approximately 200 F/g between about 600 mv and 900 mv vs. Ag/AgCl in 2M $Li_2SO_4$ electrolyte. Noteworthy are the redox peaks not present in the more disordered birnessite/nickel oxide of examples 1 and 2, indicating the presence of spinel phase in the doped and heated oxide layer.

EXAMPLE V

Fabrication of Electrode; Nanoscale Oxide Film Comprising $M_3O_4$ where M is Manganese Doped with Cobalt on Supported Carbon Xerogel.

An electrode material is formed as in EXAMPLE I, using a precursor ratio of about 0.99:0.01 manganese:cobalt.

Prior to drying, counter ions are exchanged for lithium ions by immersion of the formed electrode in an aqueous solution bearing lithium ions such as lithium nitrate, lithium sulfate or lithium hydroxide, for example. In this exemplary embodiment, lithium nitrate was used. Such immersion is carried out first under vacuum equilibration, then at room temperature or elevated temperature or under microwave heating, for example. In this exemplary embodiment, 30° C. for 4 hours was used.

The material was subsequently heated to about 300-350° C. under nitrogen atmosphere for about 1-2 hours followed by removal of ions by proton exchange with dilute acid, subsequent rinsing and drying.

Although embodiments of the invention have been described, it is understood that the present invention should not be limited to those embodiments, but various changes and modifications can be made by one skilled in the art within the spirit and scope of the invention as hereinafter claimed.

What is claimed is:

1. An electrode material comprising:
   a powder comprising:
      a surface coating or deposits of metal oxide, said metal oxide comprising one or more of manganese, nickel, cobalt, iron, aluminum, chromium, molybdenum, rhodium, iridium, osmium, rhenium, vanadium, tungsten, tantalum, palladium, lead, tin, titanium, copper, zinc, niobium and lithium, wherein the average thickness of said metal oxide coating is greater than about 5 nanometers and less than about 1000 nanometers, said metal oxide coating consisting of a crystalline phase, a partially crystalline phase or any combination thereof;
      a carbon powder selected from a group consisting of a carbon xerogel, carbon microfibers, carbon nanofibers, carbon nanotubes, graphite, graphene, carbon black, activated carbon or any combination thereof;
   said carbon powder comprising pores of above average pore size and pores of below average pore size, wherein said pores of above average pore size have an average diameter larger than about one nanometer and wherein pores of below average pore size are smaller than about ten micrometers; wherein the average particle size of said carbon powder is greater than about 10 nanometers and smaller than about 30 micrometers in its largest dimension.

2. The carbon powder of claim 1 formed with use of a template.

3. The carbon powder of claim 1 formed with use of a nitrogen dopant.

4. The material of claim 1, wherein the oxide coating has a general formula of $M_2O_7$, $M_2O_5$, $M_3O_4$, $MO_2$, $LiMO_2$, $LiM_2O_4$, $Li_4M_5O_{12}$, or $Li_{28+y}M_{20}O_{48}$,
   wherein y is greater than or equal to 0 and less than or equal to 8,
   wherein M is one or more of manganese, nickel, cobalt, iron, aluminum, chromium, molybdenum, rhodium, iridium, osmium, rhenium, vanadium, tungsten, tantalum, palladium, lead, tin, titanium, copper, zinc, niobium or lithium.

5. A secondary battery cell comprising:
   an electrolyte;
   an electronically insulating but ionically conductive separator film;
   a pair of electrodes, at least one of said pair of electrodes comprising:
      a composite comprising the material of claim 4,
      a binder, and
      at least one of activated carbon, hard carbon, carbon nanotubes, carbon nanofibers, graphene or graphite, wherein said pair of electrodes is separated by said separator film;
   a current collector, each electrode physically attached and electronically connected to said current collector, wherein said current collector is selected from a group consisting of metal foil, metal mesh, electrically conductive polymer composites, expanded metal or any combination thereof; and
   electrolyte, said electrolyte comprising salts of alkali metal in at least one of an aqueous solvent, a non-aqueous solvent, a polymer, an ionic liquid or any combination thereof.

6. A capacitor cell comprising
   a first electrode comprising a composite, said composite comprising the material of claim 1, a binder and at least one of activated carbon, hard carbon, carbon nanotubes, carbon nanofibers, graphene or graphite;
   a second electrode comprising:
      a composite comprising the material of claim 1, a binder, and at least one of activated carbon, hard carbon, carbon nanotubes, carbon nanofibers, graphene or graphite,
      a porous activated carbon structure, or
      a composite comprising a binder and a conductivity enhancing carbon and powder, said conductivity enhancing carbon and powder comprising one or more of a metal oxide, a metal carbide, a metal nitride, a metal phosphate, activated carbon, hard carbon, carbon nanotubes, graphene or graphite;
   an electrolyte;
   an electronically insulating but ionically conductive separator film; and
   a current collector; said first electrode and said second electrode being separated by said separator film, each said electrode physically attached and electronically connected to said current collector; said electrolyte comprising salts of alkali metal in at least one of an aqueous solvent, a non-aqueous solvent, a polymer, an ionic liquid or any combination thereof; wherein said current collector is selected from a group consisting of metal foil, metal mesh, electrically conductive polymer composites, expanded metal and combination thereof; wherein said optional carbon structure or carbon powder is used with or without nitrogen doping.

7. A method for producing an electrode material comprising:
reacting a metal salt with a surface of a carbon, wherein said reacting is an oxidation/reduction reaction, wherein said metal salt is contained in an aqueous precursor solution, said precursor solution further comprising ionic species, and wherein said carbon is infiltrated with said precursor solution;
reducing said ionic species on the surface of said carbon and co-depositing in oxide form upon said carbon, wherein said aqueous precursor solution is maintained at a temperature above about 20° C. and below about 250° C. during said infiltration;
said infiltration comprising:
a/ immersing and equilibrating said carbon powder in a bath of said aqueous metal salt precursor solution, or
b/ applying pressure spray consisting of said aqueous metal salt precursor solution upon said carbon powder, said solvent of said aqueous metal salt precursor solution consisting of one or more of purified water, an organic solvent such as an alcohol, pH buffer, additional cation salts or any combination thereof, said aqueous metal salt precursor solution selected from the group of metals consisting of manganese, nickel, cobalt, iron, aluminum, chromium, molybdenum, rhodium, iridium, osmium, rhenium, vanadium, tungsten, tantalum, palladium, lead, tin, titanium, copper, zinc, niobium, lithium and combinations thereof;
wherein said electrode material is a carbon powder with a surface coating or deposits of metal oxide.

8. The method of claim 7, said aqueous precursor solution comprising ultrapure water, or a buffer solution further comprising one or more metal salt(s) in the form of $M(NO_y)_z xH_2O$, $MCl_y$, $xH_2O$, $MF_y$, $MI_x$, $MBr_y$, $(MCl_y)_z xH_2O$, $M(ClO_y)_z xH_2O$, $MF_y$, $M_y(SO_z)_w$, $MSO_z xH_2O$, $M_yP$, $MPO_3 xH_2O$, $M(OCH_y)_z$, $MOSO_3 xH_2O$, or $M(C_yO_z)xH_2O$,
where x is a value greater than or equal to 0 and less than or equal to 12,
y is a value greater than or equal to 0 and less than or equal to 4,
z is a value greater than or equal to 0 and less than or equal to 4,
w is a value greater than or equal to 0 and less than or equal to 4, and
M is selected from a group consisting of manganese, nickel, cobalt, iron, aluminum, chromium, molybdenum, rhodium, iridium, osmium, rhenium, vanadium, tungsten, tantalum, palladium, lead, tin, titanium, copper, zinc, niobium, lithium, $NaMnO_4$, $KMnO_4$, $LiMnO_4$, $K_2FeO_4$, titanium(III) chloride tetrahydrofuran complex (1:3), titanium diisopropoxide bis(acetylacetonate), titanium(IV) isoproprxide, titanium(IV) (triethanolaminato) isoproprxide, titanium(IV) bis(ammonium lactato)dihydroxide, titanium(IV) butoxide, titanium(IV) ethoxide, titanium(IV) oxyacetylacetonate, titanium(IV) phthalocyanine dichloride, titanium (IV) propoxide, titanium(IV) sulfide, titanium(IV) tert-butoxide, titanium(IV) 2-ethylhexyloxide, $K_2TiF_6$, $FeSO_4NH_3CH_2CH_2NH_3SO_4 4H_2O$, Iron(II) acetate, Iron(II) acetylacetonate, ammonium iron(III) oxalate trihydrate, Iron(III) citrate, $NaNO_3$, $KNO_3$, $LiNO_3$, $Na_2SO_4$, $K_2SO_4$, $Li_2SO_4$, NaOH, KOH, and LiOH; wherein said aqueous precursor solution contains no co-solvent, or said aqueous precursor solution contains an organic co-solvent.

9. The method of claim 7 wherein said oxidation/reduction reaction between said carbon powder and said aqueous metal salt precursor solution occurs while the reactants are exposed to microwave energy.

10. The method of claim 7, wherein cation(s) of said ionic species is/are incorporated within said metal oxide, further comprising:
exchanging said cation(s) incorporated within said oxide coating for other cations or protons.

11. The method of claim 7, further comprising:
heating said electrode material subsequent to formation of said metal oxide coating, wherein said heating is above about 70° C. and below about 250° C. as hydrothermal processing in an autoclave or wherein said heating is above about 70° C. and below about 1000° in inert atmosphere, oxidizing, or reducing atmosphere or any combination thereof.

12. The method of claim 7, further comprising
grinding said electrode material subsequent to formation of said metal oxide coating, or subsequent to counter-ion exchange, or subsequent to heat processing; wherein said grinding reduces particle size of said electrode powder material, and further exposes carbon surface to other particles of said electrode material in a composite electrode, and further exposing said carbon to ionic species in the electrolyte.

* * * * *